United States Patent
Wild et al.

(12)

(10) Patent No.: US 11,178,060 B2
(45) Date of Patent: Nov. 16, 2021

(54) SELF FORMING LOCAL FABRIC

(71) Applicant: Hewlett Packard Enterprise Development LP, Houston, TX (US)

(72) Inventors: Christopher Wild, Santa Clara, CA (US); Craig Mills, Davis, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/595,690

(22) Filed: Oct. 8, 2019

(65) Prior Publication Data

US 2021/0105218 A1     Apr. 8, 2021

(51) Int. Cl.
| | |
|---|---|
| *H04L 12/801* | (2013.01) |
| *H04L 12/24* | (2006.01) |
| *H04L 12/46* | (2006.01) |
| *H04L 12/707* | (2013.01) |
| *H04L 12/713* | (2013.01) |
| *H04L 12/751* | (2013.01) |

(52) U.S. Cl.
CPC .......... *H04L 47/33* (2013.01); *H04L 12/4633* (2013.01); *H04L 41/145* (2013.01); *H04L 45/02* (2013.01); *H04L 45/22* (2013.01); *H04L 45/586* (2013.01)

(58) Field of Classification Search
CPC . H04L 12/4633; H04L 12/4641; H04L 12/46; H04L 47/33; H04L 47/35; H04L 47/11; H04L 47/10; H04L 45/02; H04L 45/16; H04L 45/22; H04L 45/24; H04L 45/20; H04L 45/586
USPC ....................................................... 370/235
See application file for complete search history.

(56) References Cited

U.S. PATENT DOCUMENTS

| | | | |
|---|---|---|---|
| 7,903,647 B2 | 3/2011 | Kanekar et al. | |
| 8,942,245 B2 | 1/2015 | Aybay et al. | |
| 9,288,105 B2 | 3/2016 | Anumala et al. | |
| 2006/0206709 A1* | 9/2006 | Labrou | G06Q 20/4014 713/167 |
| 2015/0188753 A1* | 7/2015 | Anumala | H04L 12/4675 370/225 |
| 2016/0191380 A1* | 6/2016 | De | H04W 40/02 370/338 |
| 2016/0197853 A1* | 7/2016 | Kumar | H04L 43/10 370/389 |
| 2017/0374560 A1* | 12/2017 | Judge | H04L 41/145 |
| 2018/0152373 A1* | 5/2018 | Logue | H04L 49/355 |
| 2018/0278429 A1* | 9/2018 | Johnsen | G06F 16/2255 |

(Continued)

OTHER PUBLICATIONS

Data Center Multi-Tier Model Design, (Web Page), May 14, 2008, 29 Pgs.

*Primary Examiner* — Phong La
(74) *Attorney, Agent, or Firm* — Hewlett Packard Enterprise Patent Department (57) ABSTRACT

Examples include blocking an interface of a sponsor networking device from receiving data packets and receiving at the sponsor networking device an authentication packet from a first networking device. The first networking device is physically connected to the interface. Examples also include automatically setting by the first networking device, a unique local address for the first networking device; receiving, at the sponsor networking device, a local data packet from the first networking device, and translating, by the sponsor networking device, the local data packet to an off-fabric data packet.

14 Claims, 7 Drawing Sheets

(56) References Cited

U.S. PATENT DOCUMENTS

| | | |
|---|---|---|
| 2019/0097918 A1 | 3/2019 | Ponnuswamy et al. |
| 2019/0278454 A1* | 9/2019 | Washeleski ........... G06F 3/0416 |
| 2020/0304427 A1* | 9/2020 | Sandler ................. H04L 49/253 |

* cited by examiner

SELF FORMING LOCAL FABRIC

BACKGROUND

A network may comprise overlays and underlays. The underlay represents the physical infrastructure (e.g., the cables, networking devices, etc.) of the network. The overlay represents a virtual network that is built on top of the underlay. Overlays may allow for additionally layers of abstraction above the underlay. Generally, the underlay provides the service for the overlay and is responsible for the delivery of the packets within a network. In some examples, an underlay may serve multiple different overlays.

BRIEF DESCRIPTION OF THE DRAWINGS

The following detailed description references the drawings, wherein.

DETAILED DESCRIPTION

An overlay may be serviced by an underlay that is comprised of multiple "local" fabrics tied together. For example, a network may be comprised of multiple locations. Each location may have its own fabric which then must be linked to each other to form the network. A service provided by the network may be configured by a network overlay and span multiple physical locations. Accordingly, this overlay is serviced by the "local" fabrics at each location.

Many networks may have advanced services and high flexibility, requiring several levels of configuration and overlays that span across multiple local fabrics. For a data packet that is sent from one fabric to transverse to another fabric, the underlays of each fabric must be compatible with each other. For example, the underlay addressing of each fabric needs to align with each other and the broader network in order for the fabrics to be stitched together. Additionally, security becomes an issue with larger and more complex network underlays. Thus, the manual set-up of a fabric that services an overlay spanning across multiple fabrics may be administratively time consuming. Manual set-up where local fabrics are designed to depend on one each other may also lack flexibility when the underlay needs to be rearranged or additional devices are added to the underlay.

Examples disclosed herein address these technical problems by providing an automatically self-forming fabric. The self-forming fabric allows a newly connected networking device of a fabric to securely onboard to the network and participate in the overlay. The overlay that may be serviced by this local fabric is not limited to the one fabric and may span across other local fabrics.

In some examples disclosed herein, a network comprises a local fabric with a sponsor networking device. The sponsor networking device is already securely admitted into the network and integrated into the infrastructure of the network. In some examples, the sponsor networking device may be an aggregation switch placed in a campus location of the network (e.g., a building). The sponsor networking device may have physical interfaces that are blocked from receiving data packets but are allowed to receive authentication packets. This may ensure that the edge of the network is secure.

Upon a connection of a new networking device (e.g., a switch) to a blocked interface of the sponsor networking device, the sponsor networking device may receive an authentication packet from the newly connected networking device. The authentication packet may include information (e.g., embedded certificates) that validate that the new networking device is one allowed on the network. When the newly connected networking device is authenticated, the interface of the sponsor networking device is unblocked, allowing data packets to flow through that interface.

The newly connected networking device may establish a unique address for itself on the local fabric. In some examples, this may be using a unique vendor portion along with a reserved portion. Using this address, the newly connected networking device may send and receive routing information to and from the local fabric, allowing it to establish routes to all participants of the local fabric. The routing information may also include a default route that leads to the sponsor networking device. Accordingly, the newly connected networking device may send a local data packet to the sponsor networking device that is intended to be sent into the border network outside of that local fabric. The sponsor networking device may receive this data packet and translate it to an off-fabric data packet. This allows the newly connected networking device to establish its participation in overlays.

The newly connected networking device may also ensure that additional new devices connected to itself (e.g., a downstream switch) are securely on-boarded to the network in a similar manner. In other words, the newly connected networking device may forward packets sent by the additional new device to the sponsor networking device to ensure that the additional new device is admitted into the network and able to integrate into the overlay.

Accordingly, examples disclosed herein allow for an autonomous set-up of a local fabric and integration to an overlay without having to worry about local fabric addressing. Each local fabric may have its own routing paths that are independent of the broader network and the sponsor networking device may translate packets meant for and from the broader network. This allows for the extension of an overlay of one local fabric to another local fabric, without the need to manage the time consuming and error prone problem of underlay forwarding. Thus, examples disclosed herein do not limit the overlay of one fabric from traversing another fabric, thus allowing one client overlay connected to one local fabric to transverse to another local fabric.

In some examples, a method comprises: blocking an interface of a sponsor networking device from receiving data packets; receiving, at the sponsor networking device, an authentication packet from a first networking device to connect to a network, wherein the first networking device is physically connected to the interface in a local fabric; forwarding, by the sponsor networking device, the request to a remote authenticating device; receiving, by the sponsor networking device, an indication that the first networking device is an authorized device; opening the interface of the sponsor networking device in response to receiving the indication; automatically setting, by the first networking device, a unique local address for the first networking device; receiving, at the sponsor networking device, a local data packet from the first networking device; and translating, by the sponsor networking device, the local data packet to an off-fabric data packet.

In some examples, a network comprises a local fabric, a sponsor networking device in the local fabric, and a first networking device physically connected to a blocked interface of the sponsor networking device. The first networking device is configured to send an authentication packet to the sponsor networking device, to automatically assign itself a unique local address, and to receive routing information from the local fabric. The sponsor networking device is configured to admit the first networking device to the network and to translate a local data packet from the first networking device to an off-fabric data packet. The admitting of the first networking device may comprise opening up the blocked interface for data packet flow.

In some examples, a network comprises a local fabric, a sponsor networking device in the local fabric, a first networking device directly connected to a blocked interface of the sponsor networking device, and a second networking device directly connected to a blocked interface of the first networking device. The first networking device is configured to send an authentication packet for the network to the sponsor networking device, automatically assign itself a unique address in the local fabric, forward an authentication packet from the second networking device to the sponsor networking device, and open the blocked interface of the first networking device in response to receiving an indication that the second networking device is an authorized device. The sponsor networking device is configured to open the blocked interface of the sponsor networking device in response to receiving an indication that the first networking device is an authorized device. The second networking device is configured to send an authentication packet for the network to the first networking device.

Figure 1:
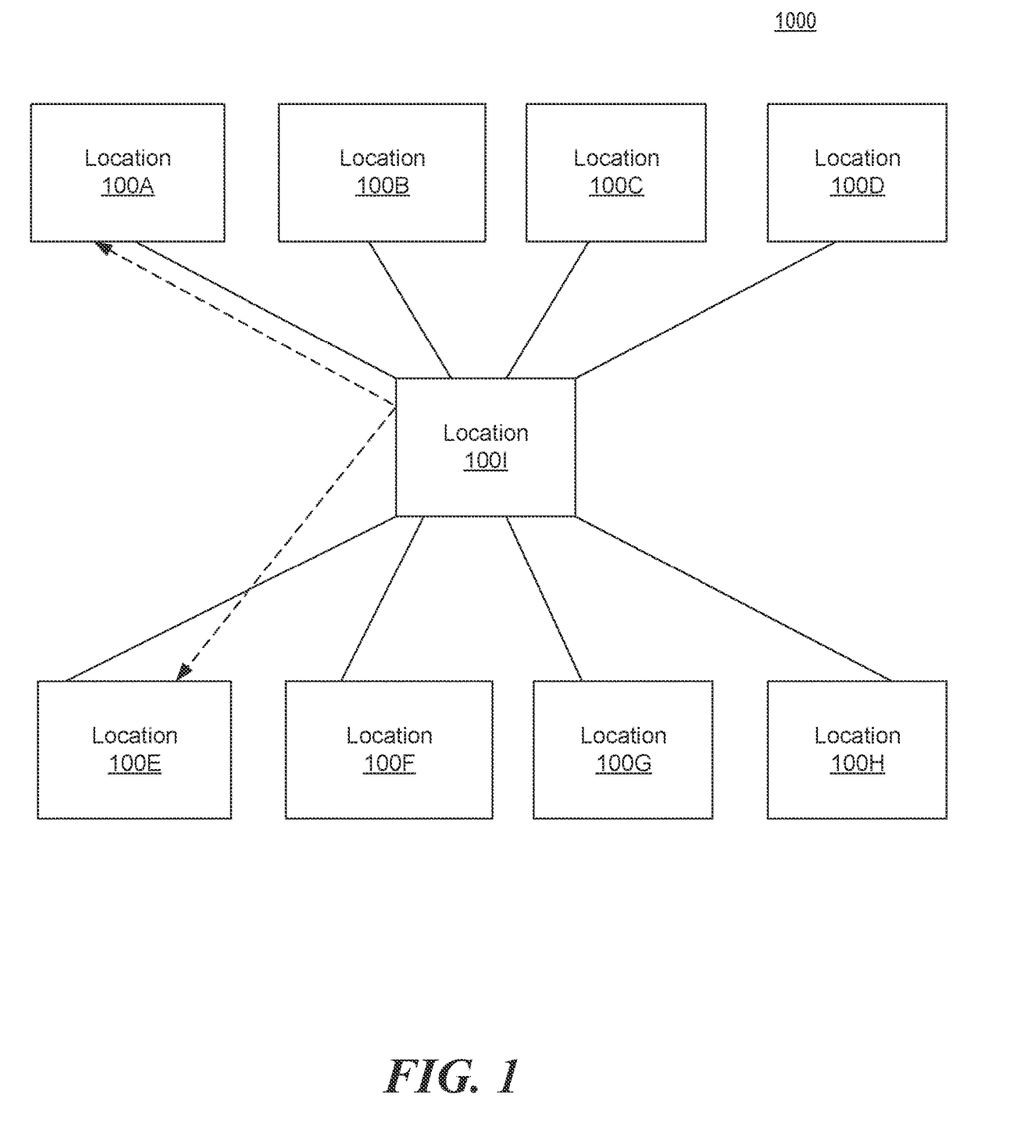
FIG. 1 is a block diagram of a network comprising of an underlay comprised of multiple local fabrics, according to some examples.

Referring now to the figures, FIG. 1 is a block diagram of a network 1000 comprising locations 100A-100I. Each location 100A-100I may comprise at least one local fabric. As used herein, a local fabric is a number of networking devices (e.g., switches, routers, etc.) that are physically connected to each other and located in the same relative location. For example, a local fabric of a network may all be in one building. Accordingly, location 100A may be a first building, location 100E may be a second, separate building, and so on. Each building may comprise at least one local fabric. In some examples, a local fabric may operate like an independent network within the larger network 1000 with a unique 32-bit area ID, like an Open Shortest Path First (OSPF) area. Accordingly, each location 100A-100I may comprise multiple local fabrics. Network 1000 may allow an end user connected to location 100A to perform a function that affects an end user connected to location 100E. That service is configured by an overlay built on top of the underlays. This overlay is represented by dashed lines in FIG. 1. Accordingly, the client overlay is serviced by the local fabrics of location 100A, 100I, and 100E.

In some examples, the overlay configuration may be coordinated by software defined networking (SDN) principles. In some SDN examples, a networking device such as a controller may coordinate the configurations across a group of switches to ensure that various settings are compatible for a specific overlay. This allows higher flexibility to meet client demands for quick service and network reconfiguration. However, this adds complexity due to the addressing of the underlay. Examples disclosed herein address these technical issues.

Figure 2A:
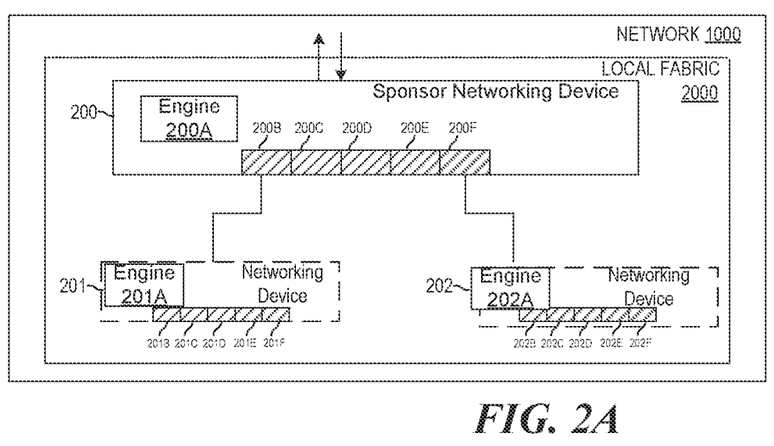
FIG. 2A is a block diagram of a local fabric comprising a sponsor networking device and two networking devices connected to the sponsor networking device, according to some examples.
Figure 2B:
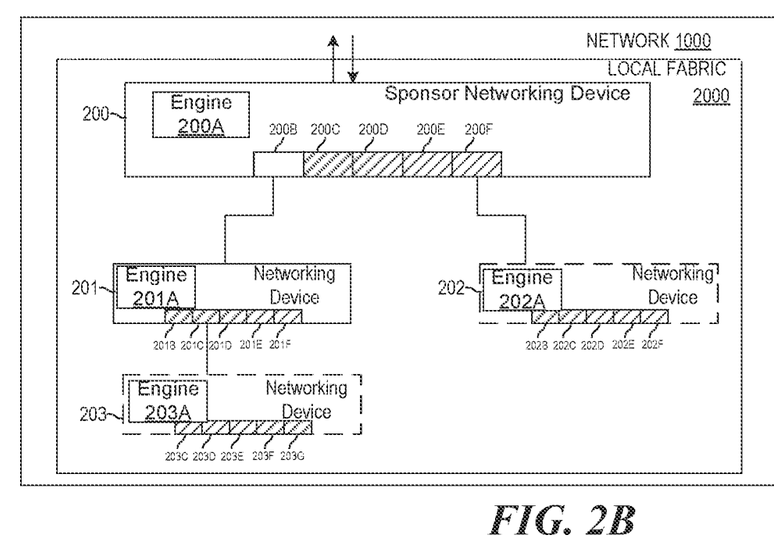
FIG. 2B is a block diagram of the local fabric of FIG. 2A with an additional networking device connected, according to some examples.
Figure 2C:
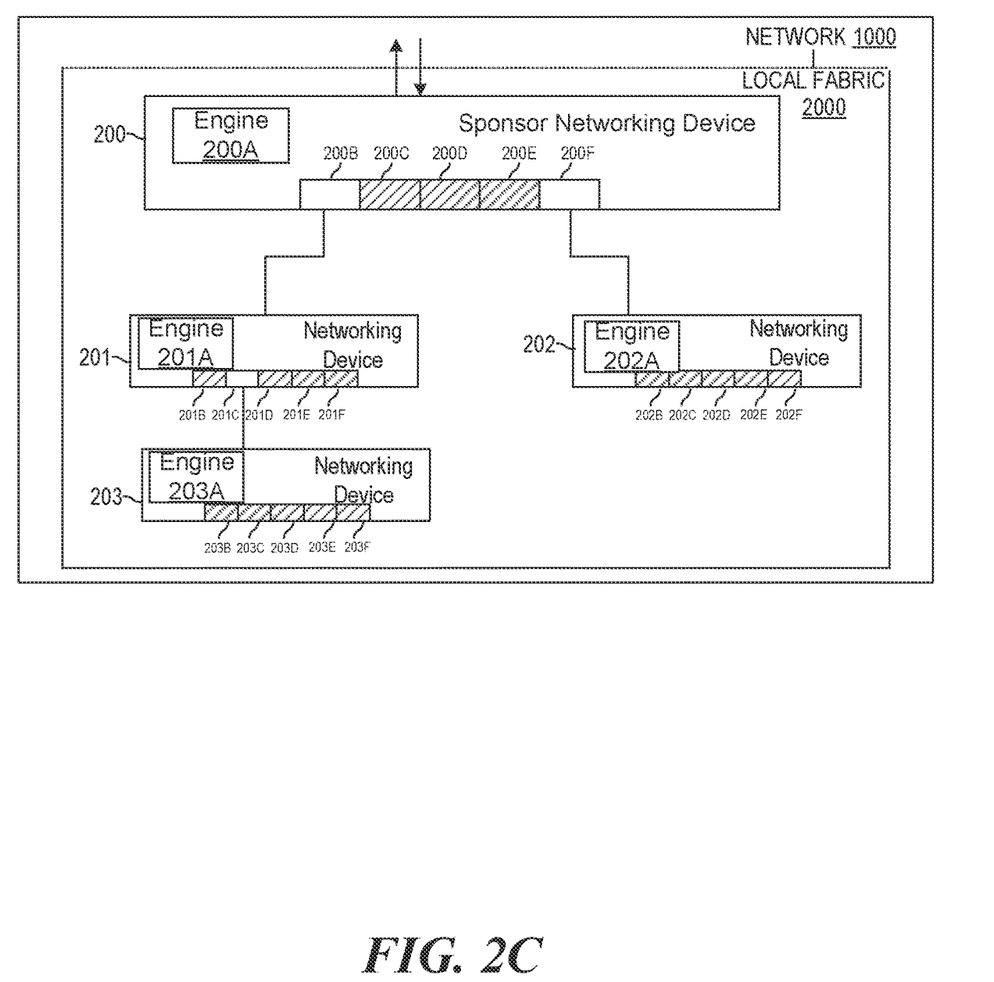
FIG. 2C is a block diagram of the local fabric of FIG. 2A with the additional networking device admitted to the network, according to some examples.

FIGS. 2A-2C represent a local fabric 2000. Local fabric 2000 may be connected to a broader network 1000, as represented by arrows. A location 100A of FIG. 1 may comprise at least one local fabric 2000. In some examples, a location 100A may comprise more than one local fabric 2000.

Local fabric 2000 comprises a sponsor networking device 200 and networking devices 201 and 202. As used herein, a networking device may be a device used in a network for the transmission of packets to the network (e.g. from an outside network), from the network (e.g. to an outside network), and/or within the network (from one device in the network to another device in the network). Non-limiting examples of a networking device include a router, switch, etc. As used herein, a sponsor networking device is a networking device that is already admitted into network 1000 and integrated into the overlays when networking devices 201 and 202 are connected to local fabric 2000.

For example, sponsor networking device 200 may be manually configured by an administrator and have specific protocols and physical elements (e.g., OSPF, Link Layer Discovery Protocol (LLDP), management configurations, e.g., ports, etc.) already provisioned at the time additional networking devices are connected to it. In some examples, sponsor networking device may be an area border router (ABR) for local fabric 2000 and may act as an aggregation switch for at least one downstream switch. In some examples, sponsor networking device 200 is both a part of the forwarding for local fabric 2000 and forwarding to network 1000.

Sponsor networking device 200 may include an engine 200A. Engine 200A and any other engines of sponsor networking device 200, may be any combination of hardware (e.g., a processor such as a central processing unit (CPU), integrated circuit (ASIC) or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines.

Engine 200A of sponsor networking device 200 can include at least one machine-readable storage mediums (for example, more than one) and at least one computer processor (for example, more than one). For example, software that provides the functionality of engines on networking device can be stored on a memory of the sponsor networking device 200 to be executed by a processor of sponsor networking device 200.

In some examples, local fabric 2000 as shown in FIG. 2A may be a fabric that is newly set up. Thus, as shown in FIG. 2A, it may start off with only sponsor networking device 200 admitted into network 1000. As new networking devices are physically connected to sponsor networking device 200, sponsor networking device 200 may securely onboard them, and networking devices that are admitted may securely on-board additional networking devices. Thus, fabric 2000 may self-form.

Sponsor networking device 200 also comprises physical interfaces 200B, 2000, 2000, 200E, and 200F. These physical interfaces may allow sponsor networking device 200 to physically connect to downstream networking devices to add on to local fabric 2000 via a cable, etc. Engine 200A of sponsor networking device 200 may allow sponsor networking device 200 to block these physical interfaces from receiving data packets, allowing only authorization packets to flow through these interfaces. Blocked interfaces are represented in FIGS. 2A-2C as being shaded in. This blocking may be accomplished by packet filtering techniques applied by engine 200A that allows the packet to be inspected and filtered out when a certain criteria is matched. For example, engine 200A may allow only specific types of packets to flow, such as packets that are to be utilized in the authentication method. In one example, sponsor networking device may rely on Link Layer Discovery Protocol (LLDP) to discover new devices and then may establish a secure connection to those devices using secure shell (SSH). Accordingly, the filters may block all types of packets besides SSH and LLDP packets. The blocking of these interfaces of sponsor networking device 200 ensures that local fabric 2000 and subsequently network 1000 stays secure while allowing the secure onboarding of new devices to the fabric.

The packets received by sponsor networking device 200 may be sent from networking device 201 and/or networking device 202. These packets may be characterized as authentication packets to join network 1000. Thus, in FIG. 2A, networking device 201 and networking device 202 are physically connected to sponsor networking device 200 but are not admitted into network 1000. This is represented in FIG. 2A by networking devices 201 and 202 shown in dashed lines. As part of the authentication process, networking device 201 and networking device 202 may send embedded certificates (e.g., based on IEEE 802.1x protocol, etc.) to sponsor networking device 200. These embedded certificates may indicate what type of device each networking device is.

Engine 200A may also allow sponsor networking device 200 to determine whether the newly connected networking devices should be admitted into network 1000. In some examples, the administrator of network 1000 may specify which types of devices are allowed in local fabric 2000. For example, the administrator may specify that only a specific type is allowed (e.g., a specific model switch from a specific vendor) or, as another example, the administrator may specify a specific serial number or medial access control (MAC) address. These types of details may be provided on a white list that is stored on engine 200A. Using the certificates received, engine 200A may perform a certificate compare to determine whether the certificates sent by networking devices 201 and 202 indicate that they are the types of devices listed on the white list. Based on a determination that they are the types of devices that should be admitted into network 1000, engine 200A may unblock the interfaces that the newly added networking devices are connected to. The unblocking of these interfaces thus allows other types of packets, including data packets, to flow through these interfaces. In some examples, this may be accomplished by removing the address of interface 200B from a blocked group of interfaces to a group that is unblocked. Based on a determination that the newly connected devices are not the types of devices that should be admitted into network 1000, engine 200A keeps the interface blocked. Additionally, engine 200A may allow sponsor networking device 200 to send a notification to an administrator of the unauthorized device to request further action.

In the examples of FIGS. 2A-2C, networking device 201 is determined to be an authorized device while networking device 202 is determined to be an unauthorized device. Accordingly, in FIG. 2B, networking device 201 is shown in solid line with interface 200E unshaded while networking device 202 is still shown in a dashed line with interface 200F still shaded.

Referring to FIG. 2B, upon admitting of networking device 201 into network 1000, networking device 201 may send data packets to other devices in the local fabric 2000 via connection interface 200B of sponsor networking device 200. Additionally, networking device 201 may send data packets to the broader network 1000 via sponsor networking device 200, as described below.

Networking device 201 may include an engine 201A. Engine 201A and any other engines of networking device 201, may be any combination of hardware (e.g., a processor such as a central processing unit (CPU), integrated circuit (ASIC) or other circuitry) and software (e.g., machine or processor-executable instructions, commands, or code such as firmware, programming, or object code) to implement the functionalities of the respective engine. Engine 201A of networking device 201 can include at least one machine-readable storage mediums (for example, more than one) and at least one computer processor (for example, more than one). For example, software that provides the functionality of engines on networking device can be stored on a memory of the networking device 201 to be executed by a processor of networking device 201.

Networking device 201 may also include physical interfaces 201B, 201C, 201D, 201E, 201F that may allow it to connect to another newly connected networking device. When networking device 201 is physically connected to sponsor networking device 200, physical interfaces 201B-201F of networking device 201 may receive authentication packets, and no other types of packets. Engine 201A of networking device 201 may block these interfaces in a similar manner to how engine 200A blocks interfaces 200B-200F of sponsor networking device 200. This keeps local fabric 2000 and subsequently network 1000 secure during the onboarding of new networking devices.

Engine 201A may allow networking device 201 to send an authentication packet to sponsor networking device 200. In some examples, engine 201A may allow networking device 201 to send an embedded certificate as part of an authentication packet to validate the type of device it is to sponsor networking device 200A. In some examples, networking device 201 may send multiple packets for authentication. These packets may all be characterized as authentication packets.

Upon receiving an indication from sponsor networking device 200 that it is authenticated, engine 201A may allow networking device 201 to establish IP connectivity to the local fabric 2000. For example, engine 201A allows networking device 201 to automatically assign itself a unique address that identifies itself to other participants in local fabric 2000. In some examples, this may accomplished using link-local IPv6 protocols. For example, engine 200A may use a medial address content (MAC) vendor portion and a reserved IP portion to build a 32 bit unique address on local fabric 2000. Engine 201A may allow networking device 200 to advertise this address in routing information sent to neighboring devices in local fabric 2000.

Accordingly, engine 201A may allow networking device 200 exchange routing information with participants in the local fabric 2000 using this unique address. In some examples, routing information may be based on the open shortest path first (OSPF) protocol. Thus, networking device 201 may use this information to build its routing tables. Accordingly, the routing information includes paths to every participant in the local fabric 2000. Similarly, sponsor networking device 200 is also assigned a link-local address in the same manner as networking device 201. Thus, sponsor networking device 200 may inject a route to itself into the routing information that is exchanged between fabric participants. This allows all networking devices in local fabric 2000 to have a path to sponsor networking device 200 to send packets to sponsor networking device 200.

All networking device in local fabric 2000 uses the same method to establish IP connectivity. Thus, while the routing information built by networking device 201 allows all participants of local fabric 2000 to send a packet to each other, the routing information is viable only in local fabric 2000. This is because the unique addresses automatically assigned by networking devices to themselves are only unique within local fabric 2000. Packets that are sent outside local fabric must have a source address that there is a path to. Devices outside of local fabric 2000 will not have a route back to the link-local addresses of local fabric 2000.

Accordingly, engine 200A of sponsor networking device 200 may translate packets that have the link local addresses of a networking device in local fabric 2000 (characterized as a local data packet) to the outside (characterized as an off fabric data packet). In some examples, this may be accomplished by a termination of the tunnel of the original data packet and then a network address translation (NAT) or a port address translation (PAT) of the payload of the original data packet. In some examples, this may be accomplished by translating the original data packet to a source address and/or destination address that has meaning outside of the local fabric 2000. These packets may go to another destination on network 1000 or to a broader network outside of network 1000, like the Internet.

Accordingly, upon admittance of networking device 201 to network 1000, engine 201A of networking device 201 may send a data packet to sponsor networking device 200. The data packet may be associated to an overlay that may need to extend across network 1000 and off local fabric 2000. Engine 200A may allow sponsor networking device 200 to receive the local data fabric and translate it to an off-fabric data packet. This subsequently allows networking device 201 to establish and interact in overlays both that are within local fabric 2000 and on the broader network 1000.

Engine 201A may also allow networking device 201 to perform a similar onboarding service for additional devices that are directly connected to it. For example, FIG. 2B shows networking device 203 being physically connected to interface 201C of networking device 201. In FIG. 2B, networking device 203 is physically connected but not admitted yet into network 1000. Engine 201A may allow networking device 201 to discover that networking device 203 is connected to it and to receive an authentication packet from networking device 203. Engine 201A may allow networking device 201 to forward the authentication packet it receives from networking device 203 to sponsor networking device 200. In some examples, this may be accomplished by engine 201A using a packet processing rule that forwards the packets that are not rejected at interface 201C (due to the blocking rule discussed above) to sponsor networking device.

Sponsor networking device 200 can authenticate networking device 203 based on a similar method as described above in relation to the authentication of networking device 201. Accordingly, engine 200A of sponsor networking device 200 allows it to authenticate networking devices that are not directly connected to it (e.g., like networking device 203 in FIG. 2B). Engine 201A may receive an indication of whether networking device 203 is authenticated from sponsor networking device 200 and forward the indication to networking device 203.

Upon receiving an indication from sponsor networking device 200 that networking device 203 is authenticated, engine 201A of networking device 201 opens interface 201C so that packets other than those needed for authentication (e.g., data packets) can flow through the interface. Once the interface is open, networking device 203 may communicate with the local fabric 2000.

Engine 203A, upon receiving an indication from networking device 201 that it is authenticated may allow networking device 203 to establish IP connectivity. For example, engine 203A allows networking device 203 to automatically assign itself a unique address that identifies itself to other participants in local fabric 2000 using the same method as described above in relation to networking device 201. Engine 203A may allow networking device 203 to advertise this address in packets sent to neighboring devices (e.g., networking device 201) in local fabric 2000.

Accordingly, engine 203A may allow networking device 203 to exchange routing information with participants in the local fabric 2000 using this unique address. In some examples, routing information may be based on the OSPF protocol. Thus, networking device 203 may use this information to build its routing tables. The routing information will include a route to sponsor networking device 200. Thus, networking device 203 also has a route to sponsor networking device 200 and other participants of local fabric 2000. Accordingly, upon admittance of networking device 203 to network 1000, engine 203A of networking device 203 may send a data packet to sponsor networking device 200. The data packet may be associated to an overlay that may need to extend across network 1000 off local fabric 2000. Engine 200A may allow sponsor networking device 200 to receive the local data fabric and translate it to an off-fabric data packet. This subsequently allows networking device 203 to establish and interact in overlays both that are serviced by local fabric 2000 and other fabrics on network 1000. The overlay may be a client service overlay or a management overlay.

Networking device 203 may include an engine 203A. Engine 203A and any other engines of networking device 203, may be any combination of hardware (e.g., a processor such as a central processing unit (CPU), integrated circuit (ASIC) or other circuitry) and software (e.g., machine or processor-executable instructions, commands, or code such as firmware, programming, or object code) to implement the functionalities of the respective engine. Engine 203A of networking device 201 can include at least one machine-readable storage mediums (for example, more than one) and at least one computer processor (for example, more than one). For example, software that provides the functionality of engines on networking device can be stored on a memory of the networking device 201 to be executed by a processor of networking device 203.

Networking device 203 may also include physical interfaces 203B, 2030, 203D, 203E, 203F that may allow it to connect to another newly connected networking device. When networking device 203 is physically connected to networking device 201, physical interfaces 203B-203F of networking device 203 may receive authentication packets, and no other types of packets. Engine 203A of networking device 203 may block these interfaces in a similar manner to how engine 200A blocks interfaces 200B-200F of sponsor networking device 200. This keeps local fabric 2000 and subsequently network 1000 secure during the onboarding of new networking devices that may be connected to networking device 203.

Engine 203A may also allow networking device 203 to perform a similar onboarding service that networking device 201 performed for it to additional devices that are directly connected to it (e.g., connected to interfaces 203B-203F). FIG. 2C shows local fabric 2000 with networking device 203 and 202 admitted into network 1000. Networking device 202, like networking device 201 comprises an engine 202A. Engine 202A may allow networking device 202 to perform similar functions that engine 201A allows networking device 201 to perform. Networking device 202 also comprises interfaces 202B-202F that are blocked, similar to interfaces 201B-201F when networking device 201 is first connected to sponsor networking device 200. Accordingly, local fabric 2000 may be expanded to and added to securely and automatically without administrators needing to worry about the addressing of the underlay.

In some examples, sponsor networking device 200 may forward an authentication packet that is received (from any networking device) to a remote authorization device. This includes remote authorization devices that are not on local fabric 2000 but on network 1000 and/or devices that are located off of network 1000, like those in the remote authentication dial-in user service (RADIUS) protocol. The sponsor networking device 200 may receive an indication from the remote authentication device that the newly connected networking device is authenticated and may send this indication to the newly connected networking device. Based on this indication, the newly connected networking device may assign itself a unique address and begin routing information exchange, as discussed above.

Figure 3:
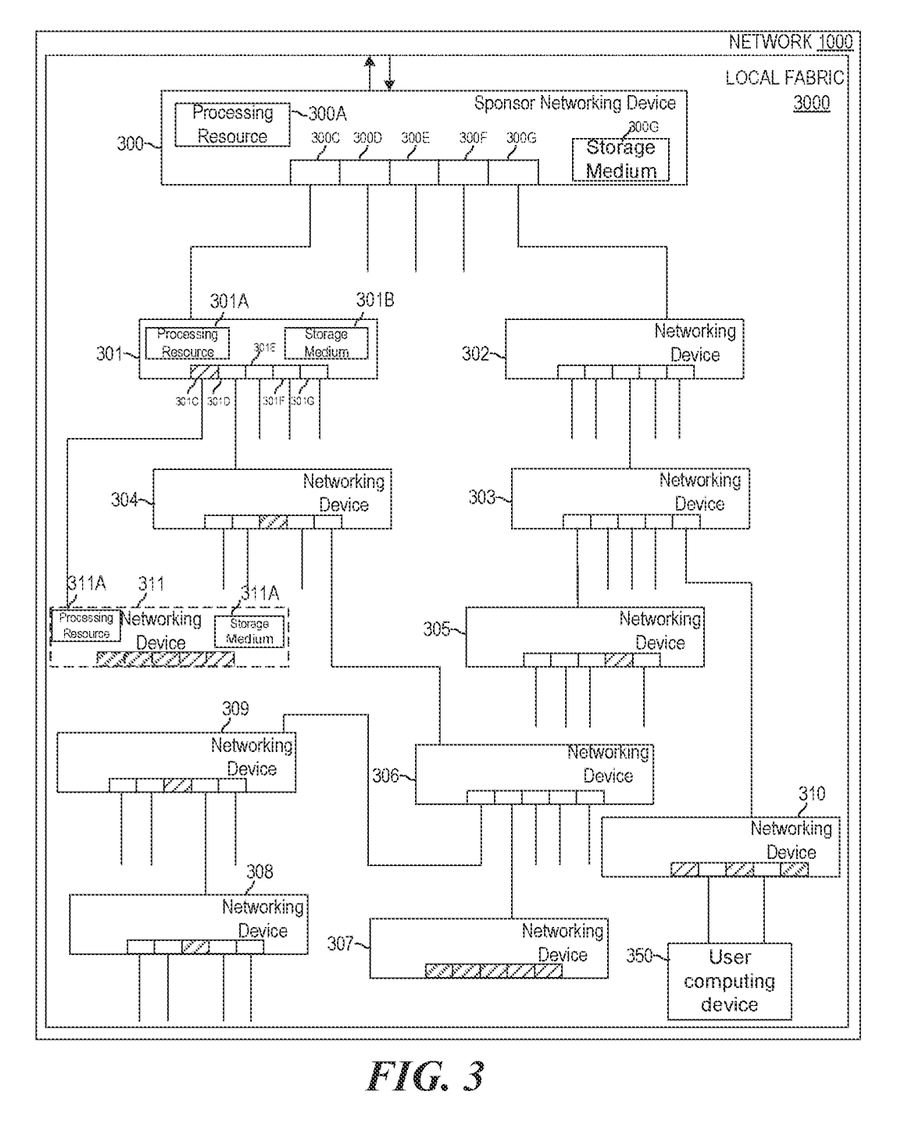
FIG. 3 is a block diagram of an established local fabric with the addition of a new networking device, according to some examples.

While the networking devices of FIGS. 2A-2C have been discussed in terms of engines, it may include aspects of networking devices of FIG. 3, which is described in terms of instructions and processing resource(s).

FIG. 3 represents a portion of local fabric 3000 that is connected to larger network 1000. This connection is represented by the arrows in FIG. 3. As shown in FIG. 3, local fabric 3000 may be comprised of sponsor networking device 300, networking devices 301-310, and user computing device 350. As used herein, a "user computing device" may include a desktop computer, a workstation, a mobile phone, a tablet, an electronic reader, or any other processing device or equipment that is used by an end user to access the network. Local fabric 3000 may include other networking devices, user computing devices, access points, etc. that are not shown in FIG. 3.

Sponsor networking device 300 may comprise a processing resource 300A, machine-readable storage medium 300B, and physical interfaces 300C, 300D, 300E, 300F, 300G. Machine readable storage medium 300B may be in the form of non-transitory machine-readable storage medium, such as suitable electronic, magnetic, optical, or other physical storage apparatus to contain or store information such as instructions, related data, and the like. As used herein, "machine-readable storage medium" may include a storage drive (e.g., a hard drive), flash memory, Random Access Memory (RAM), content-addressable memory (CAM), any type of storage disc (e.g., a Compact Disc Read Only Memory (CD-ROM), any other type of compact disc, a DVD, etc.) and the like, or a combination thereof. In some examples, storage medium 300B may include different types of memory for different types of information. In some examples, a storage medium may correspond to memory including a main memory, such as a Random Access Memory, where software may reside during runtime, and a secondary memory. The secondary memory can, for example, include a non-volatile memory where a copy of software or other data is stored. The storage medium 300B may also include a memory separate from main memory, such as a content addressable memory (CAM), tor TCAM to hold data that is used for networking. Instructions may be stored on storage medium 300B and are executable by processing resource 300A. Sponsor networking device 300 may be functionally similar to sponsor networking device 200 except that some or all functions performed by sponsor networking device 200 may be accomplished on sponsor networking device 200 by execution of instructions stored on storage medium 300B by processing resource 300A.

Networking device 301 may comprise a processing resource 301A, machine-readable storage medium 301B, and physical interfaces 301C, 301D, 301E, 301F, and 301G. Networking device 301 may be functionally similar to networking device 201 except that some or all functions performed by networking device 201 may be accomplished on networking device 301 by execution of instructions stored on storage medium 300B by processing resource 300A. Each networking device of networking devices 302-310 may similarly comprise its own processing resource and machine-readable storage medium, which are not shown in FIG. 3 for simplicity. Additionally, each networking device of networking devices 302-310 may have physical interfaces to which other networking devices and/or user computing devices may be connected.

As compared to local fabric 2000, local fabric 3000 may be an established fabric, with many networking devices connected already admitted into network 1000. This is represented in FIG. 3 by the number of physical interfaces that are unshaded in networking devices 302-310. The process of admittance of those already admitted networking devices is similar to the process described above in relation to local fabric 2000. Accordingly, local fabric 3000 was similarly established as a self-forming fabric. Some networking devices, such as networking device 301, networking device 309, networking device 308, networking device 307, networking device 310, networking device 305, networking device 304, and networking device 301 still have interfaces that are blocked as no devices have been connected to those interfaces. This is represented in FIG. 3 by shading of those interfaces.

In local fabric 3000, user computing device 350 is connected to an interface of networking device 310. This may be an indirect connection where user computing device 350 connects via an access point (not shown) that is connected to networking device 310. Networking device 310 may receive a data packet from user computing device 350 that is part a specific client overlay. This specific client overlay may have computing devices that are connected to a networking device in local fabric 2000 (not shown in FIGS. 2A-2C). Due to the self-forming nature of local fabric 3000 and local fabric 2000 and the translations of sponsor networking devices 2000 and 3000, the client overlay that spans the two local fabrics 3000 and 2000 may be configured without the administrator having to worry about the underlay addressing of the local fabrics 3000 and 2000. That is, networking device 310 may send the local data packet to sponsor networking device 300, sponsor networking device 300 may translate that local data packet such that it transverses network 1000 to arrive at local fabric 2000. At local fabric 2000, sponsor networking device 200 may receive the data packet, translate it to data packet that is local to local fabric 2000, and send it accordingly to the networking device in local fabric 2000.

Local fabric 3000, like local fabric 2000, may also securely onboard a new networking device 311 to another networking device 301 with limited interaction from an administrator. Upon connection of networking device 311 to blocked interface 301C of networking device 301, networking device 311A may send an authentication packet to networking device 301. Networking device 301 may forward the authentication packet to sponsor networking device 300. Upon receiving an indication that networking device 311 is authorized, networking device 301 may unblock physical interface 301C. Accordingly, networking device 311 may automatically assign itself a unique address in local fabric 3000 and exchange routing information with neighboring networking devices. Networking device 311 may now have a path to sponsor networking device 300 so that it may receive and/or send packets for management data packets and user data packets. In some examples, networking device 301 may forward packets (data and other) from networking device 311 to sponsor networking device 300 until networking device 311 establishes its own routing protocols, configuration, overlays, etc.

While the networking devices of FIG. 3 have been discussed in terms of instructions and processing resource(s), they may include aspects of networking devices of FIGS. 2A-2C which is described in terms of engines.

Figure 4:
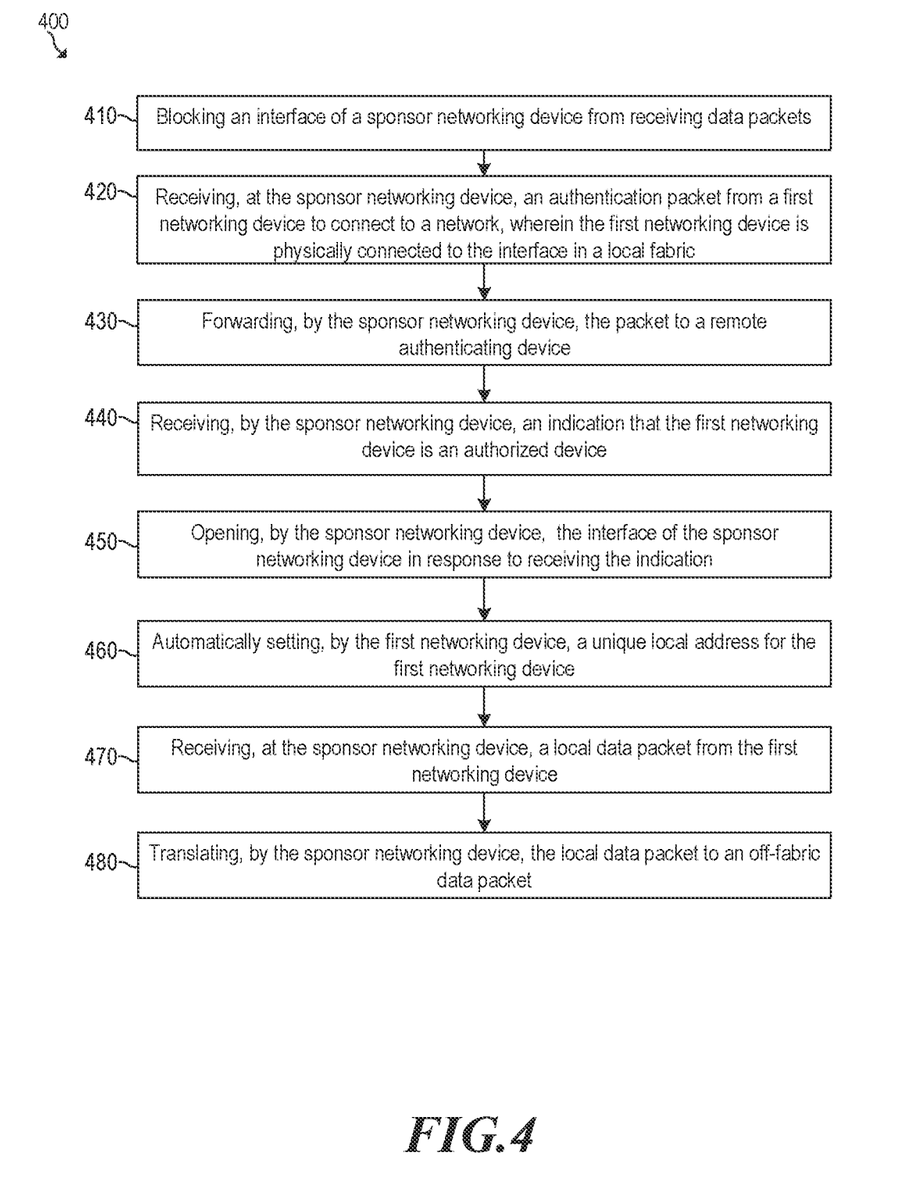
FIG. 4 is a block diagram of a flowchart of connecting a new networking device to a sponsor networking device, according to some examples.

FIG. 4 illustrates a flowchart for method 400 for a self-forming local fabric of a network. Although execution of method 400 is described below with reference to the networking devices of FIGS. 2A-2C, other suitable devices for execution of method 400 may be used.

At 410, engine 200A of sponsor networking device 200 may block interface 200B from receiving data packets. In some examples, this may be accomplished by filtering packets received by type of packet. For example, a processing rule applied on the packet filter may only allow LLDP packets and SSH packets through. This is because LLDP may allow sponsor networking device 200 to discover new devices connected and SSH may allow sponsor networking device 200 to set up a secure connection to the newly connected device without first having to validate it.

At 420, engine 200A of sponsor networking device 200 may receive an authentication packet from networking device 201 that is physically connected to interface 200B. In some examples, engine 201A of networking device 201 may send an embedded certificate to establish its identity. In some examples, this process may follow the IEEE 802.1x protocol. At 430, engine 200A of sponsor networking device 200 may forward the request to a remote authenticating device. In some examples, the remote authenticating device may be part of a RADIUS protocol. An administrator may set up, via access policies and white lists, devices that are allowed on the network. The identity of the device may be checked against the policy/white list to see if the device is allowed.

Based on a determination that the device is allowed on the network, the remote authenticating device may send an indication back to sponsor networking device 200 that networking device 201 is allowed. The indication may be received by engine 200A of sponsor networking device 200.

In response to receiving the indication, engine 200A may open interface 200B such that it may receive and send data packets, including user data packets and management data packets. Additionally, the response may be sent to networking device 201. In response to receiving this response, engine 201A of networking device 201 may automatically set for itself a unique local address. This allows it to be identified uniquely in the local fabric 2000. Additionally, networking device 201 may exchange routing information to and from local fabric 2000. The routing information may include a default route to sponsor networking device 200. In some examples, the routing information may follow the OSPF protocol.

Upon being admitted to the network, networking device 201 may send packets to participants in local fabric 2000 and to destinations outside of local fabric 2000. For example, engine 201A of networking device 201 may send a data packet with its address as the source address. However, because the source address is an address that is viable only in local fabric 2000, it cannot be forwarded off local fabric 2000. At 470, engine 200A of sponsor networking device 200 may receive the local data packet and at 480 of method 400, engine 200A of sponsor networking device 200 may translate the local data packet to an off-fabric data packet such that the packet may be sent off local fabric 2000. Translation may be completed as described in relation to FIGS. 2A-2C.

Although the flowchart of FIG. 4 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 4 may be provided in combination with functionalities described herein in relation to any of FIGS. 1-3.

Figure 5:
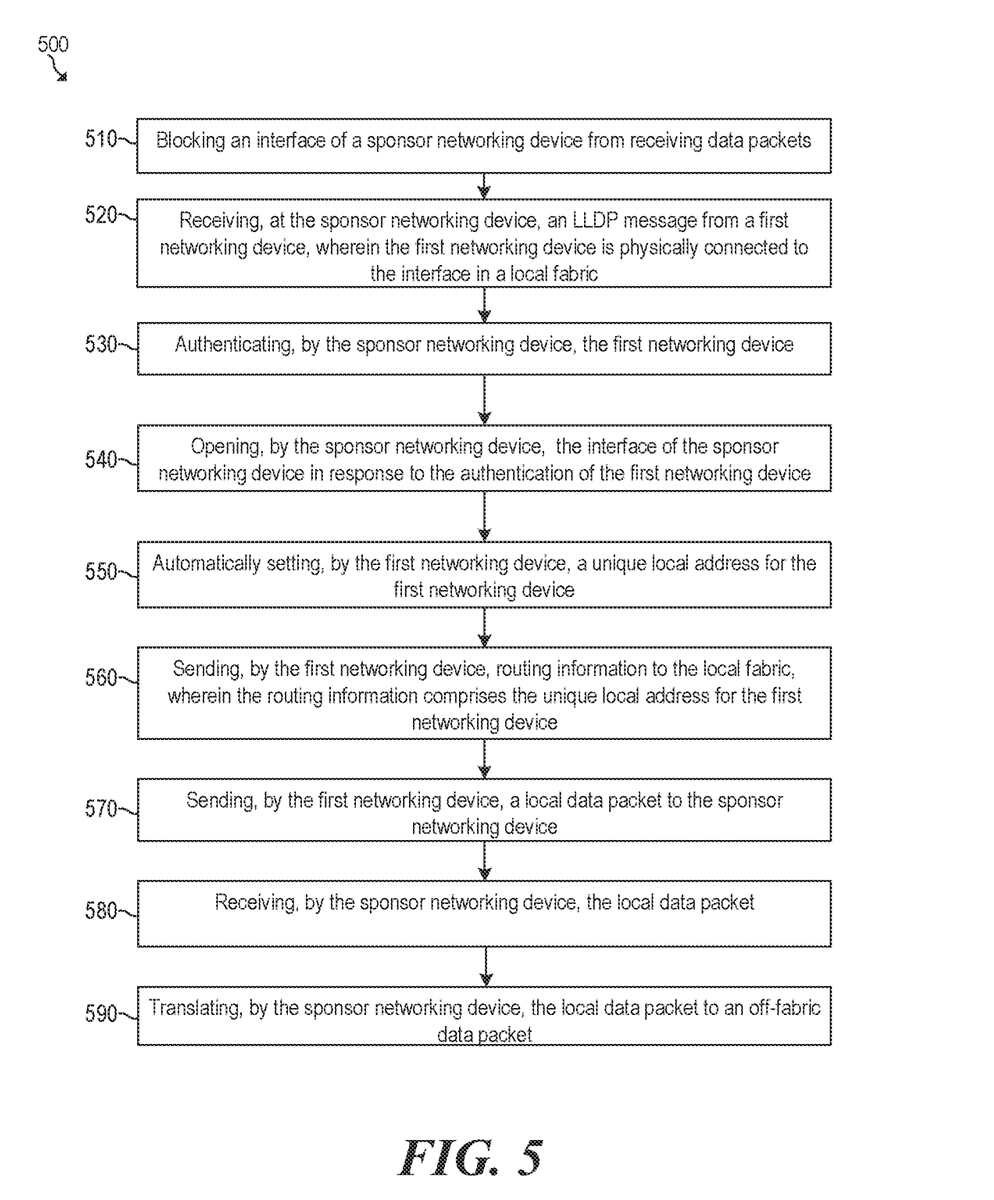
FIG. 5 is a block diagram of a flowchart of connecting a new networking device to a sponsor networking device, according to some examples.

FIG. 5 illustrates a flowchart for method 500 for a self-forming local fabric of a network. Although execution of method 500 is described below with reference to the networking devices of FIGS. 2A-2C, other suitable devices for execution of method 500 may be used.

At 510, engine 200A of sponsor networking device 200 may block interface 200B from receiving data packets. In some examples, this may be accomplished by filtering packets received by type of packet. For example, a processing rule applied on the packet filter may only allow LLDP packets and SSH packets through. This is because LLDP may allow sponsor networking device 200 to discover new devices connected and SSH may allow sponsor networking device 200 to set up a secure connection to the newly connected device without first having to validate it.

At 520, engine 200A of sponsor networking device 200 may receive an LLDP message from networking device 201 that is physically connected to interface 200B. This allows sponsor networking device 200 to understand that networking device 201 is now connected to it.

At 530, engine 200A of sponsor networking device 200 may authenticate the first networking device. In some examples, engine 201A of networking device 201 may send an embedded certificate to establish its identity. In some examples, the authentication process may follow the IEEE 802.1x protocol. An administrator may set up, via access policies and white lists devices that are allowed on the network. The identity of the device may be checked against the policy/white list to see if the device is allowed. Engine 200A of sponsor networking device 200 may authenticate the certificate by performing a certificate compare.

At 540, engine 200A may open interface 200B such that it may receive and send data packets, including user data packets and management data packets. This is done in response to a determination that the device is allowed on the network. Additionally, engine 200A may send an indication to networking device 201 that it is authenticated.

At 550, in response to receiving this response, engine 201A of networking device 201 may automatically set for itself a unique local address. This allows it to be identified uniquely in the local fabric 2000. Accordingly, routing information that it exchanges with its neighbors includes its unique local address. Additionally, at 560, engine 201A of networking device 201 may exchange routing information to and from local fabric 2000. The routing information may include a default route to sponsor networking device 200. In some examples, the routing information may follow the OSPF protocol.

Upon being admitted to the network, networking device 201 may send packets to participants in local fabric 2000 and to destinations outside of local fabric 2000. For example, at 570, engine 201A of networking device 201 may send a data packet with its address as the source address. However, because the source address is an address that is viable only in local fabric 2000, it cannot be forwarded off local fabric 2000. At 580, engine 200A of sponsor networking device 200 may receive the local data packet and at 590 of method 500, engine 200A of sponsor networking device 200 may translate the local data packet to an off-fabric data packet such that the packet may be sent off local fabric 2000. Translation may be completed as described in relation to FIGS. 2A-2C.

Although the flowchart of FIG. 5 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 5 may be provided in combination with functionalities described herein in relation to any of FIGS. 1-4.

Figure 6:
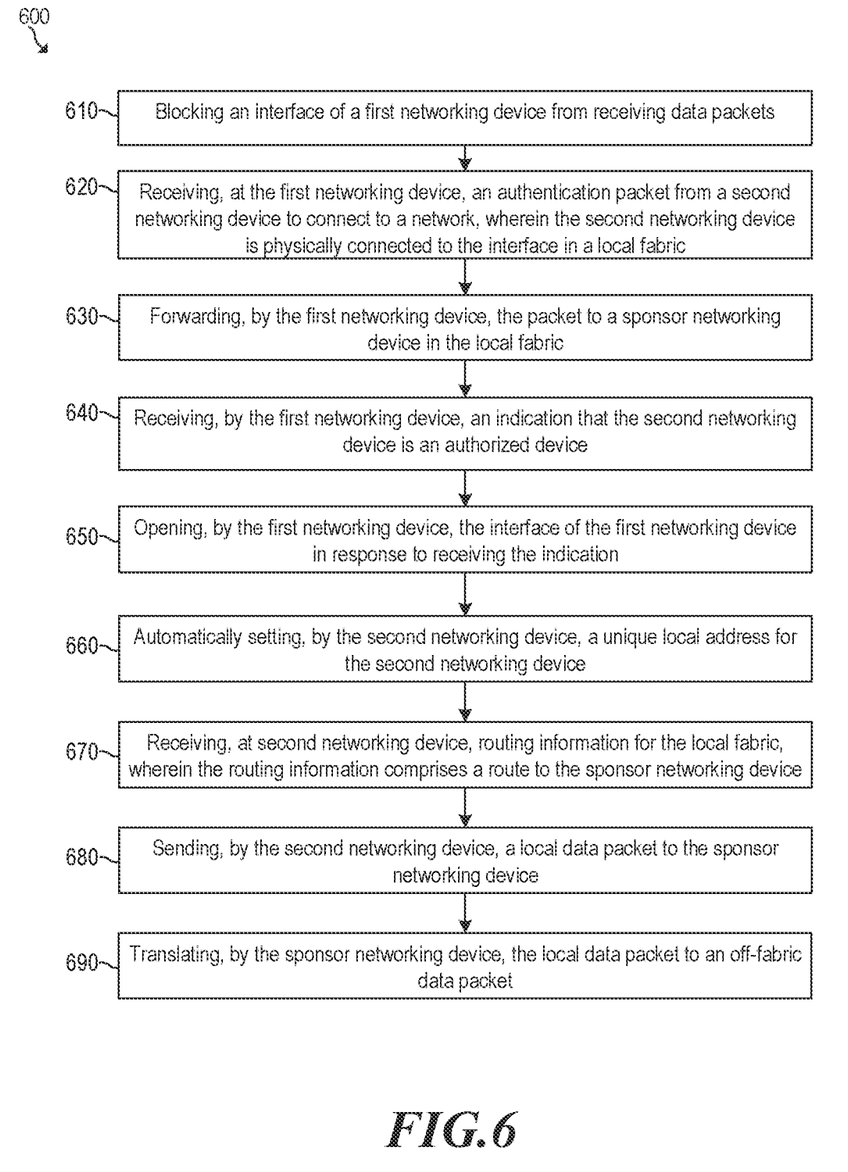
FIG. 6 is a block diagram of a flowchart of connecting a new networking device to an established local fabric, according to some examples.

FIG. 6 illustrates a flowchart for method 600 of a first networking device onboarding a second networking device. Although execution of method 500 is described below with reference to the networking devices of FIG. 3, other suitable devices for execution of method 600 may be used.

At 610, instructions on storage medium 301B are executed by processing resource 301A to block interface 301C of networking device 301. At 620, instructions on storage medium 301B are executed by processing resource 301A to receive an authentication packet from networking device 311. Networking device 311 is physically connected to interface 301C. "First", "second", "third", etc. are used herein to distinguish one networking device from another and may or may not align with the order that a networking device is connected to a network or with how many levels the device is located from a sponsor networking device. For example, a third networking device may be physically connected to an interface and admitted before a second networking device. In this specific example, networking device 301 may be characterized as a first networking device and networking device 311 may be characterized as a second networking device.

At 630, instructions on storage medium 301B are executed by processing resource 301A of networking device 301 to forward the request received at 620 to sponsor networking device 300. Thus, networking device 301 provides service to networking device 311 by forwarding its packets to sponsor networking device 300 until networking device 311 is authenticated and is able to set up its overlay, routing protocols, etc.

At 640, instructions on storage medium 301B are executed by processing resource 301A of networking device 301 to receive an indication that networking device 311 is an authorized device. This indication may be sent from sponsor networking device 300. At 650, instructions on storage medium 301B are executed by processing resource 301A to open interface 301C. This may be in response to receiving the indication.

At 660, instructions on storage medium 311B are executed by processing resource 311A of networking device 311 to automatically set for itself a unique local address. All the networking devices in local fabric 3000 may use the method to determine its unique local address. For example, each device may use a vendor portion of a media address content (MAC) plus a reserved IP portion. The reserved IP portion may be the same for each device on the local address. Accordingly, the local fabric 3000 is self-forming and does not need an administrator to configure the addressing of the local fabric. Thus, when it is stitched together with other local fabrics, each local fabric handles its own underlay addressing and forwarding without the need for an administrator to coordinate between multiple local fabrics.

At 670, instructions on storage medium 311B are executed by processing resource 311A of networking device 311 to receive routing information for the local fabric 3000. The routing information may comprise a route to sponsor networking device 300 which is inserted into the routing information by sponsor networking device. Thus, networking device 311 has a path to get to sponsor networking device 300. Additionally, any networking device in local fabric 3000 that receives the routing information will have this route to the sponsor networking device.

At 680, instructions on storage medium 311B are executed by processing resource 311A of networking device 311 to send a local data packet to sponsor networking device 300. However, because the source address is an address that is viable only in local fabric 3000, it cannot be forwarded off local fabric 2000. Accordingly, at 690, instructions on storage medium 300B are executed by processing resource 300A of sponsor networking device 300 to receive the local data packet and translate the local data packet to an off-fabric data packet such that the packet may be sent off local fabric 3000.

Although the flowchart of FIG. 6 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 6 may be provided in combination with functionalities described herein in relation to any of FIGS. 1-5.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method for a self-forming local fabric of a network, the method comprising:
blocking an interface of a sponsor networking device from receiving data packets;
receiving, at the sponsor networking device, an authentication packet from a first networking device to connect to the network, wherein the first networking device is physically connected to the interface in the self-forming local fabric and the authentication packet comprises an embedded certificate;
forwarding, by the sponsor networking device, a request to a remote authenticating device, wherein the request corresponds to the authentication packet;
receiving, by the sponsor networking device, an indication that the first networking device is an authorized device;
opening the interface of the sponsor networking device in response to receiving the indication;
automatically setting, by the first networking device, a unique local address for the first networking device;
receiving, at the sponsor networking device, a local data packet from the first networking device;
translating, by the sponsor networking device, the local data packet to an off-fabric data packet;
blocking, an interface at the first networking device from receiving data packets;
receiving, at the interface of the first networking device, a request to join the network by a second networking device, wherein the second networking device is physically connected to the interface at the first networking device;
forwarding, by the first networking device, the request from the second networking device to the sponsor networking device; and
opening the interface of the first networking device in response to the first networking device receiving an indication that the second networking device is an authorized device.

2. The method of claim 1, comprising:
automatically setting, by the second networking device, a unique local address for the second networking device.

3. The method of claim 2, comprising:
receiving, by the second networking device, routing information for the self-forming local fabric, wherein the self-forming local fabric comprises a route to the sponsor networking device.

4. The method of claim 1, wherein the unique local address for the first networking device comprises a vendor assigned portion.

5. A first networking device in a self-forming local fabric of a network, the first networking device physically connected to a blocked interface of a sponsor networking device, wherein the first networking device is configured:
to send an authentication packet to the sponsor networking device in the self-forming local fabric;
to automatically assign the first networking device a unique local address; and
to receive routing information from the self-forming local fabric; and
the sponsor networking device is configured:
to admit the first networking device to the network;
to translate a local data packet from the first networking device to an off-fabric data packet, wherein admitting the first networking device comprises opening up the blocked interface for data packet flow;
to receive an authentication packet from a second networking device physically connected to the first networking device and to forward the authentication packet from the second networking device to the sponsor networking device; and
to admit the second networking device to the network, wherein the second networking device is configured to automatically assign a unique local address for the second networking device in response to being admitted to the network.

6. The network of claim 5, wherein the unique local address for the first networking device comprises a vendor assigned portion.

7. The network of claim 5,
wherein the second networking device is configured to send routing information for the self-forming local fabric; and
wherein the routing information comprises a pre-defined route to the sponsor networking device.

8. The network of claim 5, wherein the routing information comprises the unique local address for the first networking device.

9. A network comprising:
a local fabric;
a sponsor networking device in the local fabric;
a first networking device directly connected to a blocked interface of the sponsor networking device; and
a second networking device directly connected to a blocked interface of the first networking device;
wherein the first networking device is configured to:
send an authentication packet for the network to the sponsor networking device;
automatically assign itself a unique address in the local fabric;
forward an authentication packet from the second networking device to the sponsor networking device; and
open the blocked interface of the first networking device in response to receiving an indication that the second networking device is an authorized device;
receive an authentication packet from a second networking device physically connected to the first networking device and to forward the authentication packet from the second networking device to the sponsor networking device
admit the second networking device to the network;
wherein the sponsor networking device is configured to open the blocked interface of the sponsor networking device in response to receiving an indication that the first networking device is an authorized device; and
wherein the second networking device is configured to send an authentication packet for the network to the first networking device and automatically assign a unique local address for the second networking device in response to being admitted to the network.

10. The network of claim 9, wherein the automatic assignment of the unique address for the first networking device is in response to an admission to the network.

11. The network of claim 9, wherein the second networking deice is configured to automatically assign itself a unique address in the self-forming local fabric and to receive routing information from the self-forming local fabric.

12. The network of claim 9, wherein the sponsor networking device is configured to authenticate the first networking device and the second networking device.

13. The network of claim 9, wherein the sponsor networking device is configured to send the authentication packet from the first networking device to a remote authentication device.

14. The network of claim 9, wherein the sponsor networking device is configured to translate a local data packet from the second networking device to an off-fabric data packet.

* * * * *